May 25, 1954  E. WALLACE  2,679,097
RELEASABLE LOCK FOR THE BLADES OF SHEARS
Filed May 18, 1953
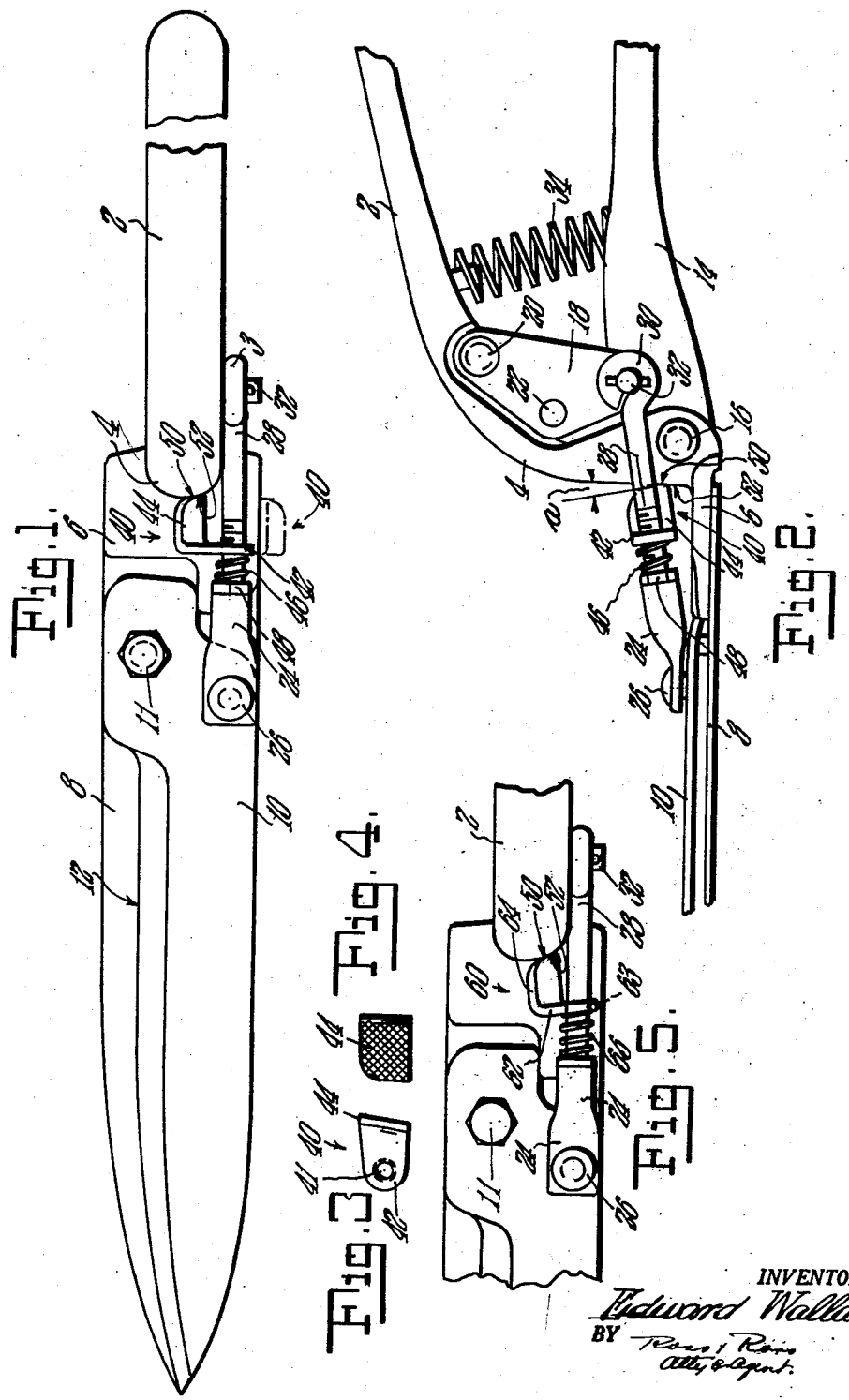
INVENTOR.
Edward Wallace.
BY Ross & Ross
Attys. & Agent.

Patented May 25, 1954

2,679,097

UNITED STATES PATENT OFFICE 2,679,097

RELEASABLE LOCK FOR THE BLADES OF SHEARS

Edward Wallace, Longmeadow, Mass., assignor to Wallace Mfg. Corp., West Springfield, Mass., a corporation of Massachusetts Application May 18, 1953, Serial No. 355,554

8 Claims. (Cl. 30—248)

This invention relates to improvements in shears and is directed more particularly to locks for releasably locking the blades of shears in their closed relation.

The principal object of the invention is the provision of a lock mechanism adapted to releasably lock the blades of shears in closed relation which is easily and readily manipulated and is characterized by means adapted to retain the lock when in unlocked position in readiness for movement to locking position.

The lock arrangement of the invention is particularly adapted for shears commonly referred to as clipper shears of the type disclosed in application for Letters Patent of the United States, Serial No. 273,451, filed February 26, 1952.

Locks for shears of the general type to which the invention relates have been provided and consist essentially of an element carried by one shear handle which is engageable with a portion of another handle. Such locks are objectionable in that the locking device when unlocked interferes with the manipulation of the shear by the user, is likely to release when the shear is dropped and does not operate, when locking the shear to hold the points of the blades in superposed aligned position.

According to novel features of this invention, locking means is provided which is movable on a blade actuating member of the shear between blade locking and releasing positions, is adjustable so that the points of the blades may at all times be held in register in the closed position thereof, in blade open position of the lock it is positioned for ready movement to locking position and the lock is not likely to unlock should the shear be dropped.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of a shear having the blades held in closed relation by the locking device of the invention associated therewith;

Fig. 2 is a side elevational view of the handle end of the shear shown in Fig. 1;

Figs. 3 and 4 are end and rear elevational views of the lock shown in Figs. 1 and 2; and Fig. 5 is a partial plan view similar to Fig. 1 showing a modified form of the invention.

Referring now to the drawings more in detail, the invention will be fully described.

An upper handle 2 has a forward downwardly extending portion 4 which terminates in a plate portion 6. A blade 8 is suitably secured to the portion 6 and extends forwardly therefrom. A blade 10 is pivoted at 11 to the blade 8 and said blades are provided with inner cooperating cutting and shearing edges such as 12.

A lower handle 14 is pivotally connected at 16 to the upper handle for swinging thereof relative to the upper handle.

A link 18 is pivotally connected at 20 and 22 to the upper and lower handle members, as shown.

An end member 24 is pivoted at 26 to the blade 10 and is internally threaded to receive the forward threaded end of an actuator 28. The actuator is formed with an eye 30 on its rear end for swinging on a pivot pin 32 of link 18.

As the handles 2 and 14 are squeezed in the hand, the blades are swung from open to the closed position shown. When released the handles are separated by a spring 34 therebetween. Thus relative movements of the handles towards and away from one another brings about relative opening and closing movements of the blades through action of the actuator 28.

A locking device 40 is provided which is in the form of an L having a primary leg 42 and a secondary leg 44 disposed at an angle relative thereto.

The leg 42 of the lock is in threaded engagement with the threaded end portion of the actuator 28 and is swingable between the locking position shown in Fig. 1 and an outer releasing position shown by dash-dot lines in said figure.

A spring 46 around the actuator 28 is disposed between the lock 40 and a lock nut 48 of the actuator. Said spring yieldingly bears on the part 42 of the lock when said lock is in releasing or unlocking position to hold it in said position and against swinging so that the lock is in readiness for swinging inwardly to its locking position when desired.

When it is desired to lock the blades in closed relation, the handles are squeezed together against action of spring 34 and the lock is swung inwardly so that part 50 thereof engages and traverses face 52 with more or less of a cam action. With the lock in locking position the handles may be released and except for the lock the handles would be swung open by spring 34. In its locking position, the lock holds the actuator against longitudinal movement or functions with a wedging action between the actuator and face of the handle wherefore the blades are releasably held in closed position.

By being in threaded engagement with the actuator 28 as it is the lock may be adjusted along the actuator so that in its locking position the blades are so related that their outer pointed ends are superposed or are in register which is desirable.

Regrinding of the blades may change the relationship of the points when the blades are in closed relation but the lock may be adjusted for locking the blades with their pointed ends in register.

The lower forward face 52 of the handle part 4 will be substantially flat where engaged by the end 50 of the lock and it has been found that adequate locking is provided when said face is disposed at an angle, say of seven to twelve degrees, indicated by $a$, relative to a plane extending at right angles through the longitudinal axis of actuator 28.

The leg 44 of the lock as shown in Fig. 4 is in a plane disposed angularly relative to a vertical plane extending through the threaded opening 41 of the lock and the outer side of the leg 44 is knurled as shown in Fig. 4. The disposition of the leg of the lock and the knurling facilitates ready and easy engagement thereof by the finger for swinging of the lock from its locking position.

The lock is readily and easily engaged and swung between locking and releasing positions and the construction is such that the lock is not accidentally released should the shear be dropped or jarred.

According to the modification of the invention shown in Fig. 5, a lock 60 is similar to the lock 40 and has legs 62 and 64 angularly disposed. Said leg 62 is provided with an opening loosely receiving the actuator 28 instead of being threaded thereon. A spring 66 is disposed around the actor 28 between the nut 48 and leg 62 of the lock which tends to urge the leg 62 along the actuator and away from said nut.

As the lock 60 is swung to its locking position wherein its edge 50 engages the face 52 of the handle, the spring acts on the leg 62 to move it along the actuator. This causes the opening of the leg of the lock to bond on the actuator and thus the lock is releasably held in locking position.

It will be observed that the lock arrangement is such that the blades are held in closed relation with their points disposed in alignment while when desired and necessary the lock may be adjusted for maintaining the aligned relationship of the blades.

The blades are releasably held in closed relation by means which is readily and easily operable and which is not likely to release by accidental dropping of the shear.

The locking action is likened to a wedging action. The lock for its locking function is wedged between a stationary member and an elongated member to hold the latter against longitudinal blade opening movement.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Locking means for a shear having blades relatively swingable between open and closed positions by an elongated member movable longitudinally relative to a stationary member comprising, a lock member having a portion on said elongated member and a part for releasably engaging said stationary member to hold said elongated member against movement.

2. Locking means for a shear having a stationary blade and handle and a movable blade actuated by an elongated member comprising, a lock swingable between locking and releasing position on said elongated member having a part engageable with said handle in locking position for wedging said elongated member against movement.

3. The combination with a shear having a blade movable between open and closed positions relative to a blade and handle structure by an elongated actuator of locking means therefor comprising in combination, a lock member swingable on said actuator between locking and releasing positions and having a part for engaging said structure in its locking position for releasably wedging between said actuator and structure to hold said actuator against movement.

4. Locking means set forth in claim 3 including resilient means yieldingly holding said lock member against movement in locking position thereof.

5. Shear construction comprising in combination, a horizontal stationary blade having a handle fixed at the rear end thereof provided with a forward face extending substantially vertically upwardly therefrom, a movable blade pivoted to said first named blade for swinging relative thereto between blade open and closed positions, a movable handle swingably connected to said first handle, an elongated actuator pivotally connected to said movable blade and means on said movable handle cooperating with said actuator to swing said movable blade towards said stationary blade, a lock swingable about said actuator between locking and releasing positions having a part for engaging the face of the stationary handle whereby to wedge between said actuator and face and releasably hold the actuator against movement.

6. Shear construction comprising in combination, a horizontal stationary blade having a handle fixed at the rear end thereof provided with a forward face extending substantially vertically upwardly therefrom, a movable blade pivoted to said first named blade for swinging relative thereto between blade open and closed positions, a movable handle swingably connected to said first handle, an elongated actuator pivotally connected to said movable blade and means on said movable handle cooperating with said actuator to swing said movable blade towards said stationary blade, a lock swingable about said actuator between locking and releasing positions having a part for engaging the face of the stationary handle whereby to wedge between said actuator and face and releasably hold the actuator against movement, and resilient means yieldingly holding the lock against movement relative to the actuator in its locking position.

7. Shear construction comprising in combination, a horizontal stationary blade having a handle fixed at the rear end thereof provided with a forward face extending substantially vertically upwardly therefrom, a movable blade pivoted to said first named blade for swinging relative thereto between blade open and closed positions, a movable handle swingably connected to said first handle, an elongated actuator pivotally connected to said movable blade and means on said movable handle cooperating with said actuator to swing said movable blade towards said stationary blade, a lock swingable on said actuator between locking and releasing positions and adjustable therealong and provided with a part engageable with said face of said stationary handle for releasably wedging and locking said actuator against movement.

8. Shear construction comprising in combination, a horizontal stationary blade having a handle fixed at the rear end thereof provided with a forward face extending substantially vertically upwardly therefrom, a movable blade pivoted to said first named blade for swinging relative thereto between blade open and closed positions, a movable handle swingably connected to said first handle, an elongated actuator pivotally connected to said movable blade and means on said movable handle cooperating with said actuator to swing said movable blade towards said stationary blade, a lock swingable on said actuator between locking and releasing positions and adjustable therealong and provided with a part engageable with said face of said stationary handle for releasably wedging and locking said actuator against movement, and resilient means on said actuator engaging said lock for yieldingly holding it against movement on said actuator when in releasing position.

No references cited.